United States Patent
Meng

(10) Patent No.: US 11,499,428 B2
(45) Date of Patent: Nov. 15, 2022

(54) ROTOR BALANCING METHOD AND APPARATUS

(71) Applicant: Siemens Energy Global GmbH & Co. KG, Munich (DE)

(72) Inventor: Zhiqiang Meng, Loughborough (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 13 days.

(21) Appl. No.: 17/048,580

(22) PCT Filed: Apr. 18, 2019

(86) PCT No.: PCT/EP2019/060100
§ 371 (c)(1),
(2) Date: Oct. 17, 2020

(87) PCT Pub. No.: WO2019/214925
PCT Pub. Date: Nov. 14, 2019

(65) Prior Publication Data
US 2021/0372283 A1    Dec. 2, 2021

(30) Foreign Application Priority Data

May 9, 2018    (EP) .................................... 18171624

(51) Int. Cl.
*F01D 5/00*    (2006.01)
(52) U.S. Cl.
CPC .......... *F01D 5/005* (2013.01); *F05D 2220/32* (2013.01); *F05D 2230/80* (2013.01); *F05D 2240/24* (2013.01)
(58) Field of Classification Search
CPC ...... F01D 5/005; F01D 5/027; F05D 2220/32; F05D 2230/80; F05D 2240/24; F05D 2270/71; G01M 1/22; G01M 1/32
See application file for complete search history.

(56) References Cited

U.S. PATENT DOCUMENTS 5,214,585 A * 5/1993 Ehrich .................. F16F 15/322
                                                              73/462
5,277,063 A * 1/1994 Thomas .................. G01M 1/22
                                                              73/462
(Continued)

FOREIGN PATENT DOCUMENTS

RU        2492364 C1      9/2013
SU         107708 A1     11/1956
WO    2005042959 A2      5/2005

OTHER PUBLICATIONS

Foiles W C et al.: "Review: Rotor Balancing", Shock and Vibration, vol. 5, No. 5-6, pp. 325-336, XP055522352, NL, ISSN: 1070-9622, DOI: 10.1155/1998/648518, the whole document; 1998.

(Continued)

*Primary Examiner* — Lawrence Averick
(74) *Attorney, Agent, or Firm* — Wolter Van Dyke Davis, PLLC

(57)    ABSTRACT

A rotor balancing method for a gas turbine having a rotor with a first correction plane and a second correction plane, wherein a first balancing weight is attached to the first correction plane. The method includes performing a first influence run wherein first balancing weight remains fitted for the subsequent second influence run; fitting a first calibration weight to the second correction plane using a reference influence vector; performing a second influence run; removing the first calibration weight from the rotor and calculating an influence vector of the second correction plane using a first set of vibration measurements and a second set of vibration measurements taken during the first influence run and the second influence run, respectively; and carrying out balancing of the rotor by fitting a final balancing weight to the first correction plane and a second balancing weight to the second correction plane using the calculated influence vectors.

12 Claims, 4 Drawing Sheets

(56) References Cited

U.S. PATENT DOCUMENTS

2015/0128698 A1 5/2015 Sinkhorn
2019/0242774 A1* 8/2019 Trukenmueller ....... G01M 1/22

OTHER PUBLICATIONS

Kelm Ray et al.: "Texas A&M Turbomachinery Laboratory projects", Turbomachinery International, p. 16, XP055522350, Norwalk Retrieved from the Internet:bURL:http://oaktrust.library.tamu.edu/bitstream/handle/1969.1/159803/05 Pavelek.pdf?s;equence=1; [retrieved on Nov. 12, 2018] p. 6, paragraph 5-8, paragraph 4, p. 15, paragraph 3-p. 17, paragraph 3; fig. 9; 2016.
PCT International Search Report and Written Opinion of International Searching Authority dated Jul. 31, 2019 corresponding to PCT International Application No. PCT/EP2019/060100 filed Apr. 18, 2019.

* cited by examiner

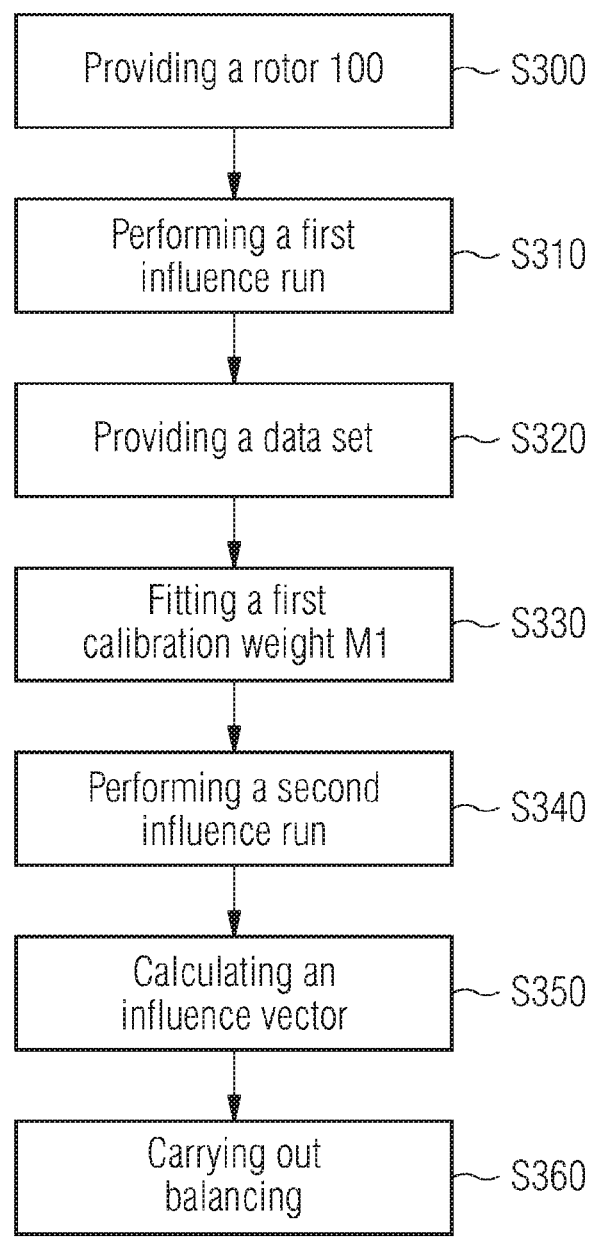

ROTOR BALANCING METHOD AND APPARATUS

CROSS REFERENCE TO RELATED APPLICATIONS

This application is the US National Stage of International Application No. PCT/EP2019/060100 filed 18 Apr. 2019, and claims the benefit thereof. The International Application claims the benefit of European Application No. EP18171624 filed 9 May 2018. All of the applications are incorporated by reference herein in their entirety.

FIELD OF INVENTION

The present disclosure relates to gas turbine engines.

In particular the disclosure is concerned with a method of balancing a rotor for a gas turbine engine and an apparatus for balancing a rotor.

BACKGROUND

Gas turbine engines, which are a specific example of turbomachines, generally include a rotor with a number of rows of rotating rotor blades which are fixed to a rotor shaft. When a hot and pressurized working fluid flows through the rows of blades in the main passage of a gas turbine, it transfers momentum to the rotor blades and thus imparts a rotary motion to the rotor. As a result of any unbalance of the rotor, vibrations are caused which may adversely affect efficiency and durability of the gas turbine. Satisfactory operation therefore requires accurate balancing of the rotor to suppress vibrations. To this end, the rotor undergoes a balancing procedure by which unbalance is assessed and balancing weights fitted to the rotor.

A known procedure for balancing may comprise mounting the assembled rotor onto a balancing machine, running the rotor at the intended balancing speed and measuring the vibrations of the rotor as part of a so called base run. Subsequently a calibration weight is temporarily fitted to one of the available correction planes included in the rotor design. The rotor is again subjected to rotation and vibrations are measured with the calibration weight in place. This so-called influence run is performed for each available correction plane separately to assess its vibration response. Based on a comparison with the base run, balancing weights are fitted. The balancing weights are fitted to reduce the unbalance of the rotor and therefore generally differ from the calibration weights in terms of both mass and angular location.

It has been found that certain types of rotors, which may be referred to as 'insensitive rotors', are more difficult to balance using the known procedure. That is to say, while certain conventional rotors may be balanced by performing, say, four or five runs in the balancing machine, for insensitive rotors a significantly greater number of runs may be required in order to meet an applicable balancing standard. In certain cases an insensitive rotor requires more than 10 runs for balancing, resulting in at least an additional work day in comparison to a sensitive rotor.

Hence a rotor balancing method reducing the number of iterations needed for balancing over conventional methods is highly desirable.

SUMMARY

According to the present disclosure there is provided a rotor balancing method, a computer-readable medium and a balancing machine as set forth in the appended claims. Other features of the invention will be apparent from the dependent claims, and the description which follows.

Accordingly there may be provided a rotor balancing method for a gas turbine. The method comprises providing a rotor (100) comprising: a first bearing (140) and a second bearing (142), and a plurality of correction planes (150) comprising a first correction plane (152) and a second correction plane (154). A first balancing weight (W1) may be attached to the first correction plane (152) and remains attached for all following influence runs. The method may further comprise performing a first influence run by: running the rotor (100) at an intended balance speed and recording a first set of vibration measurements at the first bearing (140) and the second bearing (142), wherein the vibrations detected at the first bearing (140) have a smaller magnitude than the vibrations detected at the second bearing (142). The method may further comprise providing a data set comprising a reference influence vector of the second correction plane (154), wherein the reference influence vector is an influence vector of a reference rotor (100) of the same production type as the rotor (100). The method may further comprise fitting a first calibration weight (M1) to the second correction plane (154) using the reference influence vector to determine the mass and the angular location of the first calibration weight (M1). The method may further comprise performing a second influence run by: running the rotor (100) at the intended balance speed and recording a second set of vibration measurements at the first bearing (140) and the second bearing (142), and removing the first calibration weight (M1) from the rotor (100). The method may further comprise calculating an influence vector of the second correction plane (154) using the first set of vibration measurements and the second set of vibration measurements. The method may further comprise carrying out balancing of the rotor by: fitting a final balancing weight (W1') to the first correction plane and a second balancing weight (W2) to the second correction plane (154) using the calculated influence vector.

Using the exemplary method it may be possible to determine the mass and the angular location of the first calibration weight M1 so that an improved vibration response is caused. This improved vibration response is reflected in the second set of vibration measurements, from which an improved influence vector for the second correction plane 154 may be obtained. In turn, this allows fitting a balancing weight of optimised mass to an optimised angular location. Accordingly, the method may improve on conventional rotor balancing methods by reducing the time required to reduce vibrations to a tolerable level by using an improved first calibration weight M1. For example, the number of balancing runs may be reduced. Also, the number of correction planes needed for balancing may be reduced. This may be particularly desirable where certain correction planes are difficult to access.

According to some examples, the reference influence vector comprises a magnitude which is an average over the magnitudes of a plurality of reference rotors, and the reference influence vector comprises a phase angle which is an average over the phase angles of the plurality of reference rotors. Using an average may provide for a reference influence vector which more accurately describes the rotor (100).

According to some examples, fitting the first calibration weight comprises: calculating a calibration mass and a calibration angular location to reduce vibrations at the second bearing using the reference influence vector; selecting the first calibration weight to have a mass substantially corresponding to the calibration mass; and fitting the first calibration weight to an angular location of the second correction plane substantially corresponding to the calibration angular location. By calculating both the mass and the angular location of the first calibration weight, the resulting vibration response may be improved over calculating either the mass or the angular location and using an alternative method, such as knowhow, for determining the other.

According to some examples, the magnitude of the reference influence vector of the first correction plane (152) is greater than the magnitude of the reference influence vector of the second correction plane (154), wherein the second reference influence vector is either contained in the data set or computable from the vibration measurements of the data set. By comparing the magnitude of the influence vectors it may be possible to identify a sensitive correction plane. A sensitive correction plane is expected to possess a greater magnitude. The magnitude of the reference influence vector of the first correction plane (152) is greater than the magnitude of the reference influence vector of the second correction plane (154) by at least a factor of two. Where the magnitude of the influence vectors differs greatly this may indicate that the smaller influence vector describes an insensitive correction plane. The present disclosure is particularly applicable to balancing using an insensitive correction plane and may considerably improve over conventional methods for insensitive correction planes.

According to some examples, the mass of the first calibration weight (M1) is inversely proportional to the magnitude of the reference influence vector of the second correction plane (154). Choosing the mass of the first calibration weight accordingly may provide for reduced vibrations.

According to some examples, the mass of the first calibration weight (M1) is proportional to the magnitude of the vibrations of the first set of vibration measurements, and is inversely proportional to the magnitude of the reference influence vector of the second correction plane (154). Choosing the mass of the first calibration weight accordingly may provide for reduced vibrations.

According to some examples, the mass of the first calibration weight is smaller than the magnitude of the vibrations of the first set of vibration measurements divided by the magnitude of the reference influence vector of the second correction plane (154). Due to the small magnitude of the reference influence vector the mass of the first calibration weight may be an overestimate. It may therefore improve the vibration reduction to select a smaller calibration weight. According to some examples, the mass of the first calibration weight is smaller by a factor of 2 to 3. According to some examples, the mass of the first calibration weight is between 20 grams and 45 grams.

According to some examples, fitting the first balancing weight comprises: calculating a balancing mass and a balancing angular location to reduce vibrations at first bearing and/or the second bearing using the calculated influence vector; selecting the first balancing weight to have a mass substantially corresponding to the balancing mass; and fitting the first balancing weight to an angular location of the second calibration plane substantially corresponding to the balancing angular location. By calculating both the masses and the angular locations of the final balancing weight (W1') fitted to the first correction plane and the second balancing weight fitted to the second correction plane using the influence vectors, the resulting vibration may be improved considerably over conventional methods of rotor balancing.

The present disclosure is particularly applicable to balancing using an insensitive correction plane and may considerably improve over conventional methods for insensitive correction planes.

According to some examples, the method comprises carrying out partial balancing, before performing the first influence run, by fitting the first balancing weight (W1) to the first correction plane (152) in order to reduce vibrations at the first bearing (140). Using partial balancing, the vibrations at the first bearing (140) can be reduced effectively so that a more accurate influence vector can be calculated for the second correction plane (154), because a significant relative change in the vibrations detected at the first bearing (140) is expected in response to fitting the first calibration weight (M1). According to an example, during the second run increased vibrations are recorded at the first bearing (140) than during the first run.

According to some examples, the first correction plane (152) is located on a compressor turbine disk of the rotor (100). A correction plane located on the compressor turbine disk may be particularly suitable for carrying out partial balancing, as described above, and may be less suitable for receiving the first calibration weight (M1). Identifying the first correction plane with a compressor turbine disk may therefore improve the effectiveness of the rotor balancing.

According to some examples, the second correction plane (154) is located on an exit stub shaft (108) of the rotor (100). A correction plane located on the exit stub shaft (108) may be particularly suitable for receiving the first calibration weight (M1). Identifying the second correction plane (154) with an exit stub shaft may therefore improve the effectiveness of the rotor balancing.

According to some examples, the intended balance speed is a full operational speed at or around the first critical speed of the rotor (100) at which the first bending mode of the rotor becomes significant for balancing considerations.

According to another example, there may be provided a computer-readable medium containing instructions for carrying out the method according to the present disclosure. Using the exemplary method it may be possible to determine the mass and the angular location of the first calibration weight M1 so that an improved vibration response is caused. This improved vibration response is reflected in the second set of vibration measurements, from which an improved influence vector for the second correction plane 154 may be obtained. Accordingly, the method may improve on conventional rotor balancing methods by reducing the time required to reduce vibrations to a tolerable level by using an improved first calibration weight M1.

According to some examples, the computer-readable medium is configured to instruct a processing unit to calculate the mass and the angular location of the first calibration weight (M1) using the reference influence vector of the second correction plane (154), and calculate the influence vector of the second correction plane (154). This may further improve reduce the time needed for balancing of a rotor using the present rotor balancing method.

According to another example, there is provided a balancing machine (200) comprising computer-readable medium as described above, wherein the balancing machine (200) comprises a first pedestal (212) configured to receive the first bearing (140) and a second pedestal (214) configured to receive the second bearing (142).

BRIEF DESCRIPTION OF THE DRAWINGS

Examples of the present disclosure will now be described with reference to the accompanying drawings, in which:

FIG. 4 illustrates a rotor balancing method according to the present disclosure.

DETAILED DESCRIPTION

The present disclosure relates to a method for balancing a rotor for use in a turbomachine, such as a gas turbine.

Figure 1:
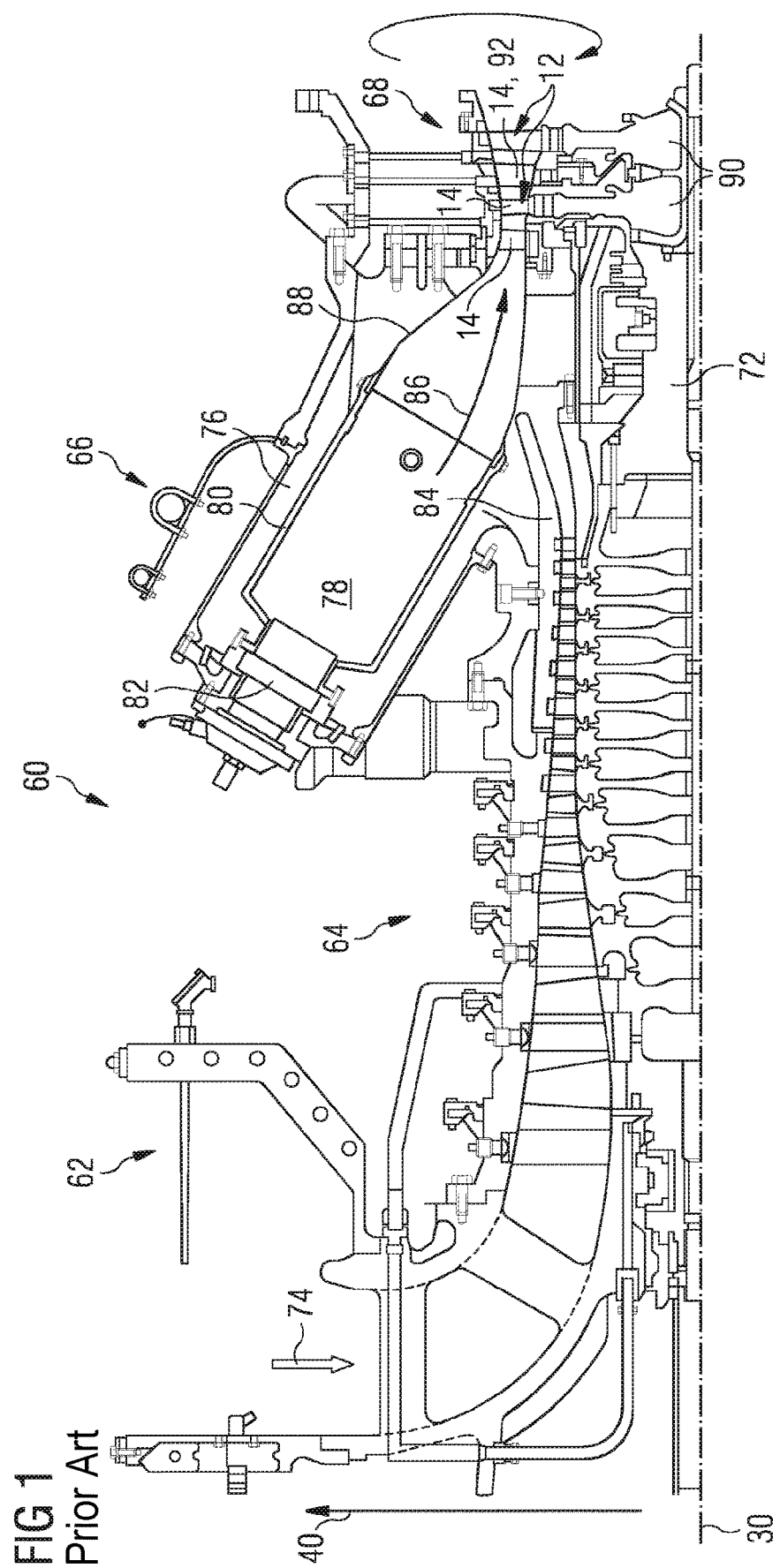
FIG. 1 is a schematic representation of an example of a turbomachine.

By way of context, FIG. 1 shows a known arrangement to which features of the present disclosure may be applied.

FIG. 1 shows an example of a gas turbine engine 60 in a sectional view, which illustrates the nature of the rotor and the environment in which it operates. The gas turbine engine 60 comprises, in flow series, an inlet 62, a compressor section 64, a combustion section 66 and a turbine section 68, which are generally arranged in flow series and generally in the direction of a longitudinal or rotational axis 30. The gas turbine engine 60 further comprises a rotor shaft 72 which is rotatable about the rotational axis 30 and which extends longitudinally through the gas turbine engine 60. The rotational axis 30 is normally the rotational axis of an associated gas turbine engine. Hence any reference to "axial", "radial" and "circumferential" directions are with respect to the rotational axis 30. The radial direction 40 is substantially perpendicular to the rotational axis 30, while the circumferential direction is perpendicular to both the rotational axis 30 and the radial direction 40.

The shaft 72 drivingly connects the turbine section 68 to the compressor section 64.

In operation of the gas turbine engine 60, air 74, which is taken in through the air inlet 62 is compressed by the compressor section 64 and delivered to the combustion section or burner section 66. The burner section 66 comprises a burner plenum 76, one or more combustion chambers 78 defined by a double wall can 80 and at least one burner 82 fixed to each combustion chamber 78. The combustion chambers 78 and the burners 82 are located inside the burner plenum 76. The compressed air passing through the compressor section 64 enters a diffuser 84 and is discharged from the diffuser 84 into the burner plenum 76 from where a portion of the air enters the burner 82 and is mixed with a gaseous or liquid fuel. The air/fuel mixture is then burned and the combustion gas 86 or working gas from the combustion is channeled via a transition duct 88 to the turbine section 68.

The turbine section 68 may comprise a number of blade carrying disks 90 or turbine wheels attached to the rotor shaft 72. In the example shown, the turbine section 68 comprises two disks 90 which each carry an annular array of turbine assemblies 12, which each comprises an aerofoil 14 embodied as a turbine blade. Turbine cascades 92 are disposed between the turbine blades. Each turbine cascade 92 carries an annular array of turbine assemblies 12, which each comprising an aerofoil 14 in the form of guiding vanes, which are fixed to a stator of the gas turbine engine 60.

Figure 2:
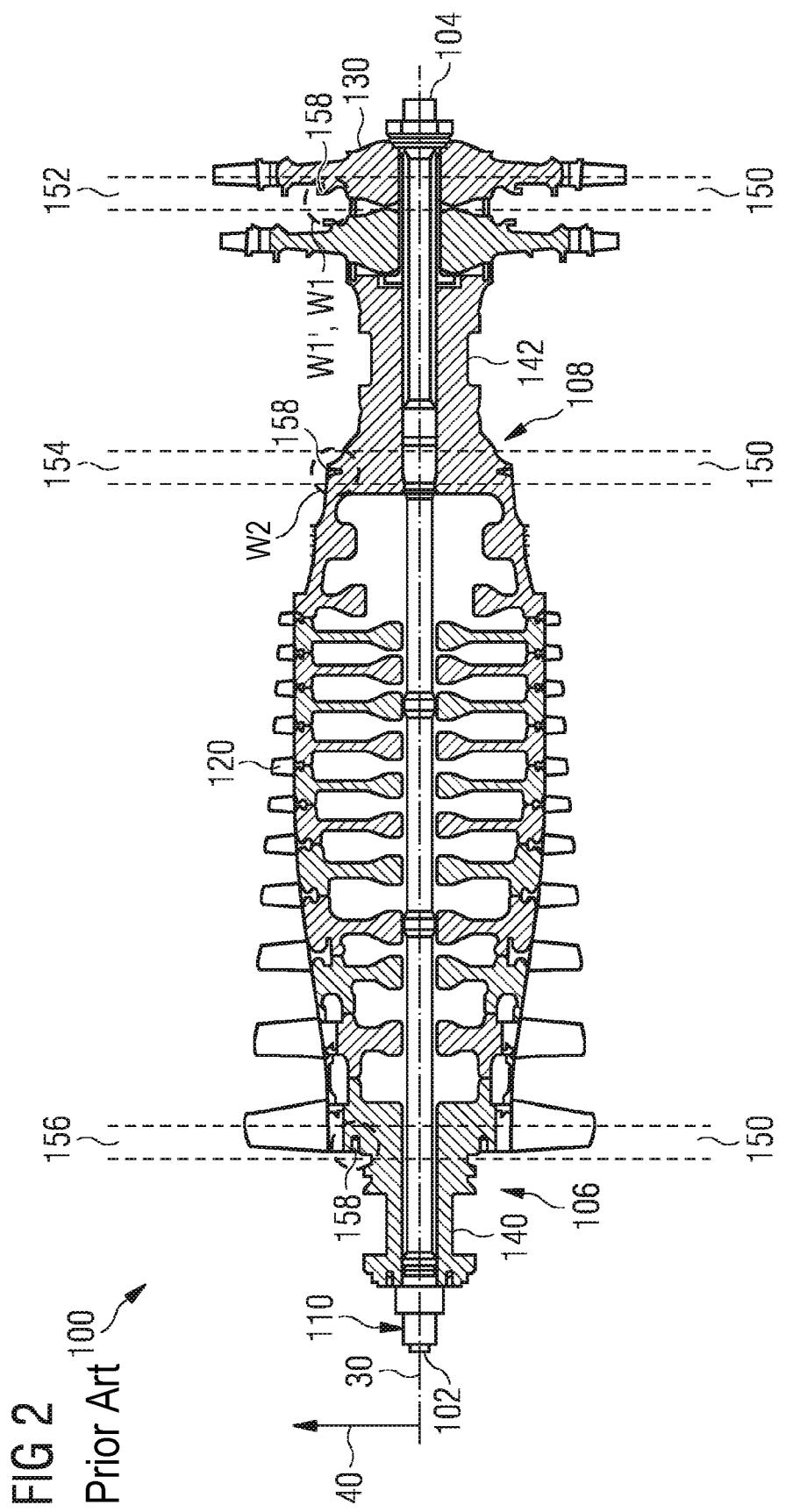
FIG. 2 is a cross-sectional view of a known rotor of a turbomachine.

FIG. 2 is a schematic cross-sectional view of an exemplary rotor 100 to which the rotor balancing method according to the present disclosure may be applied.

The rotor 100 (or 'rotor assembly') has an elongate shape. For example, the rotor assembly of the gas turbine of FIG. 1 comprises the generally cylindrical rotor shaft 72 carrying a plurality of turbine disks and compressor disks 90. The longitudinal extent of the rotor 100 is bounded by a pair of axial ends 102, 104. The first axial end 102 is an upstream end with respect to the flow of working fluid, while the second axial end 104 is a downstream end.

The rotor 100 comprises an inlet stub shaft 106 and an exit stub shaft 108. The inlet stub shaft 106 is located towards the first end 102, while the exit stub shaft 108 is located towards the second end 104. Further, the rotor 100 comprises a rotor shaft 110 carrying power turbine rotor disks 120 and compressor turbine rotor disks 130. The rotor disks 120, 130 are carried on the rotor shaft 110.

The rotor 100 comprises a pair of bearings 140, 142. The bearings (or 'bearing portions' or 'lands') are configured to be received within bearing housings of the gas turbine. According to the present example, each bearing 140, 142 comprises a smooth radial surface coaxially arranged about the rotational axis 30. By means of the bearings the rotor 100 is radially located and supported against forces in the radial direction 40. Such forces include the rotor weight as well dynamic forces, particularly those resulting from an unbalance of the rotor 100.

A plurality of correction planes 150 is provided on the rotor 100 by means of which the unbalance of the rotor 100 may be reduced. In line with its use in the art, the term 'correction plane' is understood to refer to a structural feature of the rotor rather than a geometric plane. In other words, a correction plane is a region or segment of the rotor 100. The correction planes 150 are configured to selectively receive and retain additional mass so that the mass distribution of the rotor 100 can be altered through the addition of said additional mass. That is to say, each correction plane 150 is configured to receive and retain weights in holes 158 (or 'recesses') defined by the rotor 100.

The plurality of correction planes 150 is spaced apart along the rotational axis 30. Thus means are provided for adjusting the mass distribution at each axial location where a correction plane is located. In certain known rotors, correction planes are located where the rotor designs allows rather than where it would be desirable. That to say, because of design limitations the correction planes are located where it is structurally possible to provide them, but not necessarily in regions which provide the maximal response to balancing adjustment. Furthermore, some correction planes may be difficult to access because other structures of the rotor may obstruct access thereto. It is therefore considered desirable to optimise efficacy of the available correction planes.

According to the present example, there is provided a first correction plane 152, a second correction plane 154, and a third correction plane 156. The first correction plane 152 is provided on a compressor turbine rotor disk 130. The second correction plane 154 is provided on the exit stub shaft 108. The third correction plane 156 is provided on the inlet stub shaft 106.

Each correction plane 150 comprises a plurality of holes 158, where each plurality of holes 158 is arranged symmetrically about the rotational axis 30. The holes 158 of a correction plane 150 are provided at a regular interval, i.e. equidistant angular separation, and at a fixed radial distance to the rotational axis 30. Each hole 158 of a given correction plane 152, 154, 156 therefore has a particular angular location. This particular angular location may be used to identify a specific hole 158 of a specific correction plane 152, 154, 156.

According to some examples, a correction plane 150 comprises between sixteen and twenty holes 158. According to the present example, twenty holes 158 are provided, resulting in an angular separation between adjacent holes 158 of 18° (degrees of an arc) or, equivalently, pi/10 rad (radians). A weight can be fitted into each hole in order to change the mass distribution of the rotor 100 purposes of balancing the rotor 100.

Figure 3:
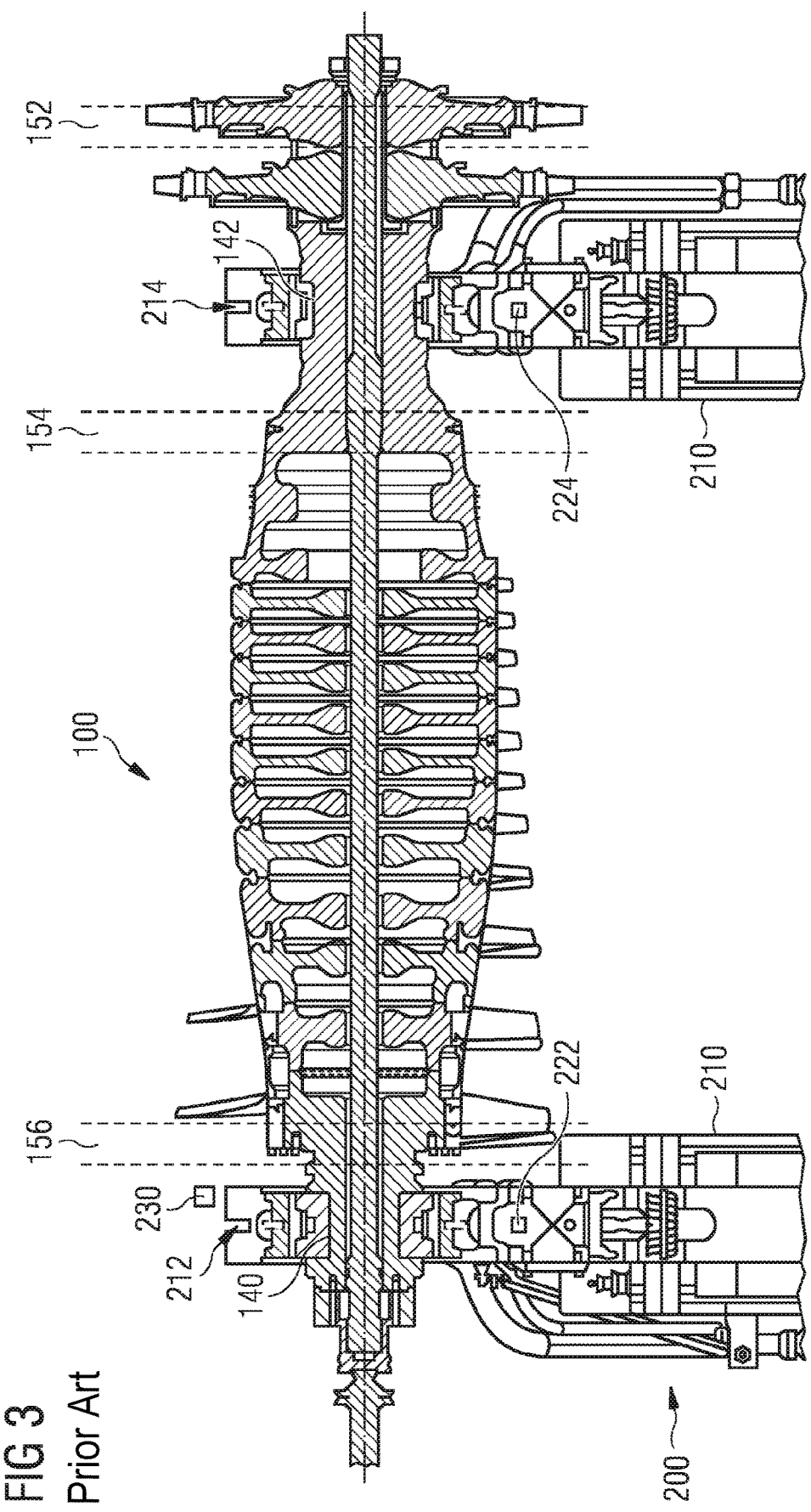
FIG. 3 is partial cross-sectional view of a balancing machine according to the present disclosure and the known rotor shown in FIG. 2.

FIG. 3 is a schematic cross-sectional view of the rotor 100 and a balancing machine 200. The balancing machine 200 is a piece of test equipment configured to simulate operation of the rotor 100 in a gas turbine and assess the performance of the rotor 100 under such operating conditions.

The rotor 100 is mountable onto the balancing machine 200 by means of a plurality of pedestals 210. The pedestals 210 are configured to carry the rotor 100 by receiving and retaining the bearings 140, 142. According to the present example, there is provided a first pedestal 212 and a second pedestal 214. The first pedestal 212 is configured to receive the first bearing 140, while the second pedestal 214 is configured to receive the second bearing 142.

The balancing machine 200 is configured to subject the rotor 100 mounted thereto to a rotational speed corresponding to an intended balance speed. The intended balance speed is a predetermined rotational speed which, according to some examples, corresponds to an operating speed of the rotor 100. For purposes of high-speed balancing the balancing machine 200 may be configured to subject the rotor 100 to a rotational speed at or around a critical speed of the rotor at which a mode shape of the rotor becomes significant for balancing considerations. For example, the rotor may be subjected to a rotational speed at or around the first critical speed of the rotor 100 at which the first bending mode of the rotor becomes significant for balancing considerations.

The balancing machine 200 comprises a plurality of vibration sensors. According to the present example, there is provided a first vibration sensor 222, and a second vibration sensor 224. The first vibration sensor 222 is located at the first pedestal 212 and configured to measure vibrations to which the first pedestal 212 is subjected. Similarly, the second vibration sensor 224 is located at the second pedestal 214 and configured to measure vibrations to which the second pedestal 214 is subjected. Such vibrations may be caused at either or at both pedestals 212, 214 by unbalance of the rotor 100.

The balancing machine 200 comprises a phase sensor 230 configured to detect the revolutions of the rotor 100. According to some examples, the phase sensor 230 is an optical sensor configured to register the revolutions of a visible feature on the rotor 100, such as a mark applied to the surface of the rotor 100. Using the phase sensor 230, the phase of the rotor 100, i.e. its orientation, may be determined.

FIG. 4 illustrates an exemplary method of balancing the rotor 100 using the balancing machine 200. The exemplary method comprises steps S300 to S370.

The method comprises step S300 according to which there is provided a rotor 100 as described above. A first balancing weight W1 is attached to the first correction plane 152 of the rotor 100. By means of the first balancing weight W1 the rotor 100 is partially balanced. That is to say, the vibrations at one of the bearings 140, 142 or, correspondingly, one of the pedestals 210 are reduced by means of the first balancing weight W1, according to some examples to below or around 1 mm/s The first balancing weight W1 has a mass and an angular location which is chosen according to any suitable process, an example of which is described below.

The method comprises step S310 of performing a first influence run. The first influence run comprises running the rotor 100 at the intended balance speed and recording a first set of vibration measurements at the first bearing 140 and the second bearing 142. The vibration sensors 222, 224 provided at the pedestals 210 are used to measure the vibrations.

Any vibrations detected at the bearings are assessed and it is determined whether and to which extent these vibrations are caused as a result of unbalance of the rotor 100. According to the present example, the only cause of vibrations is unbalance of the rotor 100.

The first set of vibration measurements R comprises a first vibration signal R1 of vibrations recorded at the first bearing 140, or the first pedestal 212, and a second vibration signal R2 recorded at the second bearing 142, or the second pedestal 214. Each vibration signal R1, R2 contains information about the magnitude of the vibrations and the phase angle of the vibrations at the respective bearing 140, 142 or pedestal 212, 214. In other words, a vibration signal contains information about a phasor.

According to the present disclosure, the vibrations at one bearing have a smaller magnitude than the vibrations detected at the other bearing as a result of the partial balancing by means of the first balancing weight W1. According to the present example, the vibrations detected at the first bearing 140 have a smaller magnitude than the vibrations detected at the second bearing 142 by approximately 1.1 mm/s. The first balancing weight W1 remains fitted for the subsequently performed first influence run and second influence run.

The method comprises step S320 of providing a data set comprising a reference influence vector of the second correction plane 154. This step is carried out prior to step S340, which requires the data set, but not necessarily after the previous steps S300, S310.

The reference influence vector of the second correction plane 154 is an influence vector of a reference rotor 100, rather than an influence vector of the rotor 100 being balanced. The rotor 100 and the reference rotor 100 are of the same production line, i.e. product type, and hence substantially identical. The data set in relation to reference rotor 100 is therefore used as an approximation for balancing the rotor 100. Using the reference influence vector is considered particularly desirable as this has been found to provide an improved set of mass and angular location values.

The method comprises step S330 of fitting a first calibration weight M1 to the second correction plane 154. Generally, a calibration weight is a test mass which is added to a correction plane 150 in order to determine the effect of the test mass on the vibrations at the bearings in order to infer the effect a balancing weight will have. Only a single calibration weight is added to the rotor 100 at any given time in order to determine the response to said single calibration weight (in addition to the first balancing weight).

The first calibration weight M1 is generally characterised by its mass and its angular position on the correction plane to which it is fitted. The mass and angular position of the first calibration weight may be determined using any suitable means, for example Equation 1 below. According to the present example, they are determined using the vibration measurement R and a reference influence vector H2'. The reference influence vector H2' is a quantity which describes or at least approximates the effect that a weight added to the second correction plane has on the vibrations detected at the bearings 140, 142. In particular, a first component H21' of the reference influence vector H2' describes the effect on vibrations at the first bearing 140 or pedestal 212, and a second component H22' describes the effect on vibrations at the second bearing 142 or pedestal 214. Each component has a magnitude and a phase, i.e. defines a phasor.

The step S330 comprises using the reference influence vector to determine the mass and the angular location of the first calibration weight M1. The mass and the angular location of the calibration weight are chosen dependent on the vibrations detected at a single bearing in order to reduce the vibrations at said single bearing. Notably, the vibration response of certain known rotors has been found to critically depend on the mass and angular location values. A set of randomly selected values may therefore yield a poor vibration response and, ultimately, an ineffective balancing weight. According to the present example, the first calibration weight M1 is attached to the second correction plane to reduce the vibrations at the second bearing 142.

The method comprises step S340 of performing a second influence run. The second influence run comprises running the rotor 100 at the intended balance speed and recording a second set of vibration measurements at the first bearing 140 and the second bearing 142. The vibrations are recorded in a second set of vibration measurements P comprising a first vibration signal P1 of the first bearing 140 (or first pedestal 212) and a second vibration signal P2 of the second bearing 142 (or second pedestal 214). As above, each vibration signal contains information about the magnitude of the vibrations and the phase of the vibrations at the respective pedestal.

The method comprises step S350 of calculating an influence vector of the second correction plane 154. Step S350 comprises using the first set of vibration measurements and the second set of vibration measurements for calculating the influence vector of the second correction plane 154. Any known means suitable for making this calculation may be used.

The method comprises step S360 of carrying out balancing of the rotor 100. Step S360 comprises fitting a finial balancing weight W1' to the first correction plane 152 and a second balancing weight W2 to the second correction plane 154 using the influence vectors of the first correction plane 152 and second correction plane 154. The masses and the angular locations of the final balancing weight W1' and the second balancing weight W2 may be determined using any suitable means, and in later sections of the present disclosure a particular example is discussed so that conventional calculation means can be used to efficiently obtain accurate results.

According to the present example, the magnitude of the influence vector of the second correction plane is smaller than the magnitude of an influence vector (or reference influence vector) of the first correction plane. In other words, the second correction plane 154 is less sensitive than the first correction plane 152.

According to some examples, using the reference influence vector H2' a calibration mass and a calibration angular location to reduce vibrations at the second bearing 142 are calculated. The first calibration weight M1 is selected to have a mass substantially corresponding to the calibration mass or 'calibration mass value' and fitted to second correction plane 154 at an angular location substantially corresponding to the calibration angular location or 'calibration angular location value'.

The mass and the angular location of the first calibration weight M1 are in some examples calculated using:

$$M1 = -R1/H22',$$ (Equation 1)

i.e. M1 equals minus R1 divided by H22'. According to the above Equation 1, the calibration weight is expressed as a function of mass and angular location. The mass is expressible in units of grams, while the angular location is expressible in units of degrees of an arc. The vibration response R1 depends on the amplitude of the vibrations, expressible in millimetres per second, and the phase angle of the vibrations, expressible in degrees of an arc. The influence vector possesses a magnitude, expressible in units of millimetres per second per gram, and a phase angle, expressible in degrees of an arc.

According to some examples, the calculated mass of the first calibration weight M1 is considered too large, for example up to 80 gram, due to the very small reference influence vector H2' of the second correction plane 154. The first calibration weight M1 may have a mass corresponding to a fraction of the calculated mass; for example half or a third. According to the present example, the first calibration weight M1 is chosen to have a mass between 40 gram to 26.7 gram, and the calculated angular location from Equation 1.

According to some examples, the magnitude of the reference influence vector of the first correction plane 152 is greater than the magnitude of the reference influence vector of the second correction plane 154. By comparing the magnitude of the influence vectors it may be possible to identify a sensitive correction plane. A sensitive correction plane is expected to possess a greater magnitude. For example, the magnitude of the first reference influence vector is greater than the magnitude of the second reference influence vector by at least a factor of two. Where the magnitude of the influence vectors differs greatly this may indicate that the smaller influence vector describes an insensitive correction plane. Additionally, it has been found that the phase angle of a reference influence vector of a reference rotor 100 may differ substantially from the actual phase angle of the rotor 100. The method according to the present disclosure compensates for this with the calculated calibration weight M1, and the reduced vibrations at the first bearing 140, such that a relatively large and accurate vibration response difference to the first set of vibration measurements R is expected.

The accuracy of approximating H2 using H2' can be optimised by using an average reference influence vector. That is to say, the reference influence vector H2' is calculated using influence vectors of a plurality of reference rotors 100. The average reference influence vector H2' has a magnitude corresponding to the average of the magnitudes of influence vectors of the reference rotors 100 and, similarly, a phase angle corresponding to an average of the phase angles of the influence vectors. The average may be calculated in any suitable form, such as the mean, the median or the mode.

The mass and the angular location of final balancing weight W1' and the second balancing weight W2 are calculated according to the influence vectors of the first correction plane and second correction plane. The influence vector of the second correction plane has been calculated from the first and the second sets of vibration measurements. In particular, this influence vector is expected to accurately describe the effect of a balancing weight added to the second correction plane because the reference influence vector H2' will have yielded an improved vibration response. More particularly, this procedure comprises calculating balancing masses and their balancing angular locations to achieve vibrations at the first bearing and the second bearing within an acceptable vibration limit using the calculated influence vector. According to the present example, this procedure comprises selecting the first balancing weight to have a mass substantially corresponding to the balancing mass; and fitting the second balancing weight W2 to an angular location of the second correction plane substantially corresponding to the balancing angular location. According to the present example, this procedure also comprises selecting the final balancing weight W1' to have a suitable mass and angular location.

According to the present example, the method comprises partially balancing the rotor 100. Partial balancing is carried out before the first influence run, by fitting the first balancing weight W1 to the first correction plane 152, in order to reduce vibrations at a single bearing. In this case, the vibrations at the first bearing 140, or the pedestal 212, are reduced by partial balancing. That is to say, the mass and the angular location of the first balancing weight W1 are chosen dependent on the vibrations at the first bearing 140. The first balancing weight W1 may reduce or increase vibrations at the second bearing 142.

Similar to how the first balancing weight W1 is configured dependent on vibrations at the first bearing 140, the first calibration weight M1 is configured solely dependent on the vibrations at the second bearing 142. Accordingly, the first calibration weight M1 may reduce or increase the vibrations at the first bearing 140. In the present example, the effect of the first calibration weight M1 is to increase the vibrations at the first bearing 140. Therefore greater vibrations are measured at the first bearing 140 during the second run than are measured during the first run. Given that the vibrations at the first bearing 140 are small, the impact of the first calibration weight M1 will be significant even though the second balancing plane 154 is insensitive. Accordingly, a more accurate influence vector may be obtained as a result.

According to the present example, the method as described above is provided on a computer-readable medium, such as a hard disk or an optical disk. That is to say, instructions for carrying out the above method, particularly with reference to steps S300 to S370, are provided on the computer-readable medium. For example, using a suitable programming language a software application may be so provided for carrying out the method. More particularly, the computer-readable medium may be configured to instruct a processing unit to carry out certain steps of the method, and may be configured to instruct an operator to carry out other steps of the method. For example, the steps S300, S310 may be carried out by the operator. Other steps that may be carried out by the operator include the fitting of the weights S330.

The computer-readable medium is configured to instruct a processing unit, e.g. a central processing unit, to calculate the mass and the angular location of the first calibration weight M1 using the reference influence vector H2', calculate the influence vector of the second correction plane 154. In the present example the computer-readable medium also contains the reference influence vector H2' or, as the case may be, the average reference influence vector.

The computer-readable medium may be part of the balancing machine 200. That is to say, the balancing machine 200 comprises the computer-readable medium.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A rotor balancing method for a gas turbine, the method comprising:
    providing a rotor comprising: a first bearing and a second bearing, and a plurality of correction planes comprising a first correction plane and a second correction plane, wherein a first balancing weight is attached to the first correction plane and remains attached for all following influence runs;
    performing a first influence run by: running the rotor at an intended balance speed and recording a first set of vibration measurements at the first bearing and the second bearing, wherein vibrations detected at the first bearing have a smaller magnitude than the vibrations detected at the second bearing;
    providing a data set comprising a reference influence vector of the second correction plane, wherein the reference influence vector is an influence vector of a reference rotor of a same production type as the rotor;
    fitting a first calibration weight to the second correction plane using the reference influence vector of the second correction plane to determine a mass and an angular location of the first calibration weight;
    performing a second influence run by: running the rotor at the intended balance speed and recording a second set of vibration measurements at the first bearing and the second bearing, and removing the first calibration weight from the rotor;
    calculating an influence vector of the second correction plane using the first set of vibration measurements and the second set of vibration measurements;
    carrying out balancing of the rotor by: fitting a final balancing weight to the first correction plane, and fitting a second balancing weight to the second correction plane using the calculated influence vector;
    wherein the mass of the first calibration weight is inversely proportional to a magnitude of the reference influence vector of the second correction plane.

2. The method according to claim 1,
    wherein the reference influence vector comprises a magnitude which is an average over the magnitudes of a plurality of reference rotors, and the reference influence vector comprises a phase angle which is an average over the phase angles of the plurality of reference rotors.

3. The method according to claim 1,
    wherein fitting the first calibration weight comprises: calculating a calibration mass and a calibration angular location to reduce vibrations at the second bearing using the reference influence vector; selecting the first calibration weight to have a mass substantially corresponding to the calibration mass; and fitting the first calibration weight to an angular location of the second correction plane substantially corresponding to the calibration angular location.

4. The method according to claim 1,
wherein the mass of the first calibration weight is smaller than the magnitude of the vibrations of the first set of vibration measurements divided by the magnitude of the reference influence vector of the second correction plane.

5. The method according to claim 4,
wherein the mass of the first calibration weight is smaller by a factor of 2 to 3.

6. The method according to claim 1,
wherein the mass of the first calibration weight is between 20 grams and 45 grams.

7. The method according to claim 1, further comprising:
carrying out partial balancing, before performing the first influence run, by fitting the first balancing weight to the first correction plane in order to reduce vibrations at the first bearing.

8. The method according to claim 1,
wherein during the second influence run increased vibrations are recorded at the first bearing than during the first influence run.

9. The method according to claim 1,
wherein the first correction plane is located on a compressor turbine disk of the rotor.

10. The method according to claim 1,
wherein the second correction plane is located on an exit stub shaft of the rotor.

11. The method according to claim 1,
wherein the intended balance speed is a full operational speed at or around a first speed of the rotor at which a mode shape of the rotor becomes significant for balancing considerations.

12. A balancing machine for balancing a rotor for a gas turbine,
the rotor comprising a first bearing and a second bearing, and
a plurality of correction planes comprising a first correction plane and a second correction plane, wherein a first balancing weight is attached to the first correction plane and remains attached for all following influence runs, the balancing machine comprising:
a first pedestal configured to receive the first bearing and a second pedestal configured to receive the second bearing;
a plurality of vibration sensors; a phase sensor configured to register the revolutions of the rotor;
wherein the balancing machine is configured to:
perform a first influence run by:
running the rotor at an intended balance speed and recording a first set of vibration measurements at the first bearing and the second bearing via the vibration sensors,
wherein vibrations detected at the first bearing have a smaller magnitude than the vibrations detected at the second bearing;
receive a data set comprising a reference influence vector of the second correction plane,
wherein the reference influence vector is an influence vector of a reference rotor of a same production type as the rotor;
perform a second influence run after fitting a first calibration weight to the second correction plane using the reference influence vector of the second correction plane to determine a mass and an angular location of the first calibration weight by:
running the rotor at the intended balance speed and recording a second set of vibration measurements at the first bearing and the second bearing, and removing the first calibration weight from the rotor;
calculate an influence vector of the second correction plane using the first set of vibration measurements and the second set of vibration measurements;
balance the rotor using the calculated influence vector after fitting a final balancing weight to the first correction plane, and fitting a second balancing weight to the second correction plane;
wherein the mass of the first calibration weight is inversely proportional to a magnitude of the reference influence vector of the second correction plane.

* * * * *